US009880552B1

(12) United States Patent
Strahan et al.

(10) Patent No.: US 9,880,552 B1
(45) Date of Patent: Jan. 30, 2018

(54) WIRELESS REMOTE CONTROL TO OPERATE A RADIOMETRIC CAMERA MOUNTED TO AN AERIAL VEHICLE

(71) Applicant: Gary Eugene Strahan, Beaumont, TX (US)

(72) Inventors: Gary Eugene Strahan, Beaumont, TX (US); Gary Forister, Beaumont, TX (US)

(73) Assignee: GARY EUGENE STRAHAN, Beaumont, TX (US)

( * ) Notice: Subject to any disclaimer, the term of this patent is extended or adjusted under 35 U.S.C. 154(b) by 0 days.

(21) Appl. No.: 15/092,907

(22) Filed: Apr. 7, 2016

Related U.S. Application Data

(60) Provisional application No. 62/144,860, filed on Apr. 8, 2015.

(51) Int. Cl.
*G05D 1/00* (2006.01)
*B64C 39/02* (2006.01)
*B64D 47/08* (2006.01)
*G05D 1/10* (2006.01)

(52) U.S. Cl.
CPC ......... *G05D 1/0038* (2013.01); *B64C 39/024* (2013.01); *B64D 47/08* (2013.01); *G05D 1/0094* (2013.01); *G05D 1/101* (2013.01); *B64C 2201/123* (2013.01)

(58) Field of Classification Search
CPC .... G05D 1/0038; G05D 1/0094; G05D 1/101; B64C 39/024; B64C 2201/123; B64D 47/08
See application file for complete search history.

(56) References Cited

U.S. PATENT DOCUMENTS

| 6,130,705 | A | 10/2000 | Lareau et al. |
| 7,079,129 | B2 | 7/2006 | Shigeta |
| 2005/0262995 | A1* | 12/2005 | Kilkis ..................... F41H 11/12 89/1.13 |
| 2006/0043303 | A1* | 3/2006 | Safai ..................... G01N 21/954 250/347 |
| 2007/0098397 | A1 | 5/2007 | Chen et al. |
| 2008/0079843 | A1 | 4/2008 | Pote et al. |
| 2009/0015674 | A1 | 1/2009 | Alley et al. |

FOREIGN PATENT DOCUMENTS

WO    WO 2014169353 A1 * 10/2014 ........... G06K 9/0063

* cited by examiner

*Primary Examiner* — Yuen H Wong
(74) *Attorney, Agent, or Firm* — Dileep P. Rao; Rao DeBoer Osterrieder, PLLC

(57) ABSTRACT

A wireless remote control assembly which includes a wireless remote control in communication with an aerial vehicle. A radiometric camera can be mounted to the aerial vehicle. The aerial vehicle can have a radiometric camera processor. A display can be in communication with an aerial vehicle processor. A remote control data storage can be in communication with a remote control processor. A power supply can be in further communication with the aerial vehicle processor. Computer instructions located in the remote control data storage can capture data from the remote control processor to the radiometric camera for a target. Furthermore, computer instructions in the remote control data storage can instruct the radiometric camera processor to perform aerial thermography to view different wavelengths simultaneously.

15 Claims, 2 Drawing Sheets

WIRELESS REMOTE CONTROL TO OPERATE A RADIOMETRIC CAMERA MOUNTED TO AN AERIAL VEHICLE

CROSS REFERENCE TO RELATED APPLICATION

The current application claims priority to and the benefit of U.S. Provisional Patent Application No. 62/144,860 filed on Apr. 8, 2015, entitled "WIRELESS REMOTE CONTROL TO OPERATE A RADIOMETRIC CAMERA MOUNTED TO AN AERIAL VEHICLE". This reference is hereby incorporated in its entirety.

FIELD

The present embodiments generally relate to a remote control for a thermographic monitoring using an aerial vehicle.

BACKGROUND

A need exists for mapping agricultural fungus and crop stresses using an aerial vehicle.

A further need exists to measure the temperatures of mechanical objects from an unmanned aerial vehicle.

A further need exists for leak detection in flat roofs using an aerial vehicle that is inexpensive and can take multiple pieces of thermographic data simultaneously.

The present embodiments meet these needs.

BRIEF DESCRIPTION OF THE DRAWINGS

The detailed description will be better understood in conjunction with the accompanying drawings as follows.

Figure 1:
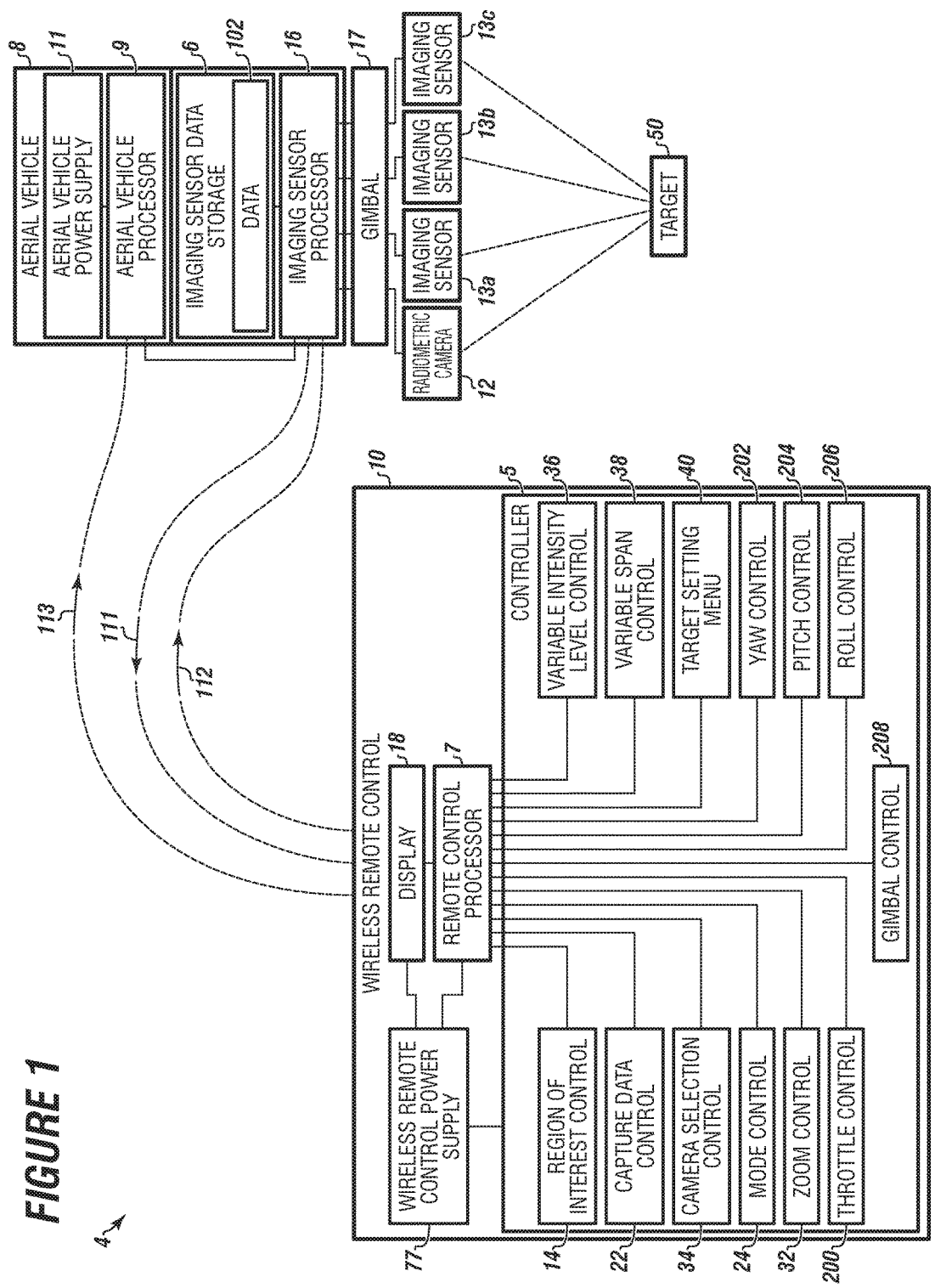
FIG. 1 depicts a wireless remote control assembly according to one or more embodiments.

The present embodiments are detailed below with reference to the listed Figures.

DETAILED DESCRIPTION OF THE EMBODIMENTS

Before explaining the present apparatus in detail, it is to be understood that the apparatus is not limited to the particular embodiments and that it can be practiced or carried out in various ways.

The present embodiments generally relate to a remote control for a thermographic monitoring using an aerial vehicle.

A benefit of the wireless remote control assembly can be the ability to more easily locate the spread of harmful fungi in crops from an aerial vantage point using thermographic imaging.

Another benefit of the wireless remote control assembly relates to discovering harmful pollutants that can leak out from structures by using thermographic imaging.

A benefit of the wireless remote control assembly can use aerial thermography to track the movements of fish or other aquatic animal, such as movement of fish at or near the surface in total darkness.

Yet another benefit of the wireless remote control assembly relates to discovering heat loss of a structure from an aerial vantage point.

The present embodiments generally relate to a wireless remote control assembly, which can include a wireless remote control for thermographic monitoring using an aerial vehicle. In embodiments, the wireless remote control can operate a radiometric camera.

In embodiments, a radiometric camera can be mounted to an aerial vehicle. The aerial vehicle can have a radiometric camera processor. A display can be in communication with an aerial vehicle processor. A remote control data storage can be in communication with a remote control processor. An aerial vehicle power supply can be in further communication with the aerial vehicle processor.

Computer instructions located in the remote control data storage can capture data from the remote control processor to the radiometric camera for a target. Furthermore, computer instructions in the remote control data storage can provide commands to perform to the radiometric camera processor aerial thermography to view different wavelengths simultaneously.

In embodiments, the data storages can contain various computer instructions to instruct at least one of the processors to perform various tasks.

In embodiments, the wireless remote control can have computer instructions in the remote control data storage to variably control intensity levels corresponding to temperatures emitted by the target.

In further embodiments, the wireless remote control can have computer instructions in the remote control data storage to variably control span to adjust a range of temperatures captured by the radiometric camera.

In embodiments, the wireless remote control can have computer instructions in the remote control data storage to change color palette to present a different representation of a temperature scale of the targets.

In embodiments, the wireless remote control can have computer instructions in the remote control data storage to change gain on a visible frequency camera mounted on the aerial vehicle.

In further embodiments, the wireless remote control can have computer instructions in the remote control data storage to change target settings, wherein target settings can have emissivity, distance, relative humidity, background reflection, ambient temperature, transmissivity, reflectivity, and combinations thereof. Wherein the target settings of the wireless remote control can be biased corrections to perceive temperature.

In embodiments, the wireless remote control can have computer instructions in the remote control data storage to widen or narrow a field of view of the radiometric camera.

In embodiments, the wireless remote control can have computer instructions in the remote control data storage to zoom toggle and camera toggle sequentially from the radiometric camera to an additional camera mounted on the aerial vehicle.

In embodiments, the wireless remote control can be in communication with an all in one aerial vehicle. Wherein the wireless remote control can fly the aerial vehicle via throttle, yaw, pitch, and roll commands.

In embodiments, the aerial vehicle can have 2 cameras to 32 cameras mounted to it.

In embodiments, the wireless remote control can have computer instructions in the remote control data storage to define a subset of pixels to monitor in real time, herein known as a target.

In embodiments, the wireless remote control can have computer instructions in the remote control data storage to provide a visual representation of intensity levels corresponding to temperatures emitted by the target.

In further embodiments, the wireless remote control can have computer instructions in the remote control data storage to provide a visual representation of the span of temp captured by the radiometric camera.

The term "aerial thermography" as used herein can refer to the technique in which an aerial mounted radiometric camera can be used to measure temperature variations on the surface of a target.

The term "aerial vehicle" as used herein can refer to any vehicle capable of flight such as, but not limited to: a drone, an airplane, a helicopter, any similar vehicle, or combinations thereof.

The term "ambient temperature" as used herein can refer to the air temperature of any environment where computers and related equipment can be kept.

The term "background reflection" as used herein can refer to the energy present on the surface of a target that can remain visible to the camera.

The term "capture data" as used herein can refer to the process or means of obtaining and storing external data, particularly images or sounds, for use at a later time.

The term "color palette" as used herein can refer to the range of colors in a visual medium.

The term "data storage" as used herein refers to a non-transitory computer readable medium, such as a hard disk drive, solid state drive, flash drive, tape drive, and the like. The term "non-transitory computer readable medium" excludes any transitory signals but includes any non-transitory data storage circuitry, e.g., buffers, cache, and queues, within transceivers of transitory signals.

The term "display" as used herein can refer to any electronic device for the visual presentation of data.

The term "distance" as used herein can refer to an amount of space between two objects, such as people.

The term "emissivity" as used herein can refer to the rate at which an object emits energy compared to that of a blackbody at a given temperature and wavelength.

The term "gain" as used herein can refer to the increase in the strength or amplitude of a signal as it traverses a circuit or material.

The term "radiometric camera" as used herein can refer to a non-contact device that can detects electromagnetic radiation, including but not limited to: radio wave, microwave, terahertz, infrared, visible light, ultraviolet, X-ray, and gamma radiation and can convert it into an electronic signal, which can then be processed to produce an image on a video monitor and can perform such functions as temperature calculations.

The term "intensity levels" as used herein can refer to the maximum and minimum temperature value for a target.

The term "imaging sensor" as used herein can refer to any type of camera capable of measuring any form of reflective light or emitted radiation. For example, an imaging sensor can be a LIDAR™ sensor, a gamma ray sensor, a near infrared frequency camera, an ultraviolet frequency sensor, microwave, millimeter wave, or another imaging sensor which can be used for performing thermographic mapping from an aerial position.

The term "pixel" as used herein can refer to a point, a line, or a region of interest.

The term "processor" as used herein can refer to a laptop, a computer, a portable hand held device, such as a cellular phone or a tablet computer, combinations thereof, or any device capable of at least two way or bidirectional communications.

The term "relative humidity" as used herein can refer to the amount of water vapor present in air expressed as a percentage of the amount desired for saturation at the same temperature.

The term "span" as used herein can refer to the difference between high and low temperature settings on a radiometric image.

The term "target" as used herein can refer to a whole area being viewed by a camera onboard an aerial vehicle.

The term "temperatures emitted by the target" as used herein can refer to the temperatures emitted from a whole area being viewed by a camera onboard an aerial vehicle.

The term "temperature scale of the targets" as used herein can refer to the temperature variation of a whole area being viewed by a camera onboard an aerial vehicle.

The term "toggle" as used herein can refer to a key or command that switches between modes, effects, features, or states.

The term "visible frequency camera" as used herein can refer to a camera that captures images in the visible wavelength spectrum.

The term "wavelengths" as used herein can refer to but are not limited to: radio waves, microwave, terahertz, infrared, visible light, ultraviolet light, X-ray, and gamma radiation.

The term "wireless remote control" as used herein can refer to a component of an electrical device used to operate a device wirelessly from a distance or a remote location.

Turning now to the Figures, FIG. 1 depicts wireless remote control assembly according to one or more embodiments.

The wireless remote control assembly 4 can include a wireless remote control 10 and an aerial vehicle 8 for performing thermography and data capture.

An aerial vehicle 8 is shown with a radiometric camera 12 and at least one imaging sensor 13a, 13b, and 13c that can be mounted to a gimbal 17.

The at least one imaging sensor 13a-13c can be, but are not limited to: near infrared sensors, gamma ray sensors, ultraviolet sensors, LIDAR™ sensors, microwave sensors, millimeter wave sensors, visible light sensors, and combinations thereof, which can be video images, still images, and combinations thereof.

The gimbal 17 can be pivotably mounted to the aerial vehicle 8 and operated by a motor to pitch, roll, and yaw, and otherwise offset vehicle movements. In embodiments, the gimbal 17 can be the size of the width of the aerial vehicle 8 or smaller than the length and width of the aerial vehicle 8 and centrally mounted to the aerial vehicle 8.

The aerial vehicle 8 can have an aerial vehicle power supply 11 which can communicate with an aerial vehicle processor 9.

The aerial vehicle 8 can be moved by a gas engine with an alternator providing DC voltages.

In other embodiments, the aerial vehicle 8 can be moved by an onboard battery which not only moves the aerial vehicle 8 but can operate the aerial vehicle processor 9.

In embodiments, the aerial vehicle processor 9 can be a microprocessor or small lightweight computer.

The aerial vehicle processor 9 can communicate commands 111 for flying the aerial vehicle 8 or with a wireless remote control 10 if the wireless remote control 10 additionally controls flight of the aerial vehicle 8.

An imaging sensor processor 16 can be in communication with the wireless remote control 10 that can provide commands 112.

The imaging sensor processor 16 can communicate with an imaging sensor data storage 6 that can receive and store captured data 102.

The wireless remote control 10 can have a display 18, a remote control processor 7 and a controller 5 that can have a plurality of controls. In embodiments, the wireless remote control 10 can have a wireless remote control power supply 77.

In embodiments, the display 18 can operate as a touch pad that can act as the controller 5.

The controller 5 can communicate with the image sensor processor 16 to selectively provide the commands 112 to the image sensor processor 16 causing the image sensor processor 16 to capture the data 102 and store the captured data in the imaging sensor data storage 6 on the aerial vehicle 8.

The controller 5 can have the region of interest control 14, the capture data control 22, the mode control 24, the camera selection control 34, the zoom control 32, the variable intensity level control 36, the variable span control 38; the target setting menu 40, and combinations thereof.

In embodiments, the controls can be toggles, a joystick, switches, or dials.

As an example, the region of interest control 14 can show data related to a subset of pixels from at least one of the imaging sensors 13a-13c.

As an example, the capture data control 22 can start or stop the capture of data from at least one of the imaging sensors 13a-13c or the radiometric camera 12 to the imaging sensor data storage 6.

As an example, the mode control 24 can allow a user to cycle through color palettes representing temperatures.

As an example, the camera selection control 34 toggles through available sensors sequentially, such as from a visible light camera to the radiometric camera.

As an example, the zoom control 32 can enable a user to enlarge or narrow the pixels, and switch from standard view to a 2x, 4x, or 32x zoom.

As an example, the variable intensity level control 36 can enable a user to set a maximum and minimum temperature value for a target 50.

As an example, the variable span control 38 can enable a user to take the maximum and minimum temperature values and scale both temperature values simultaneously, sliding up and down a visible scale or scale bar.

In embodiments, the wireless remote control 10 can also fly the aerial vehicle 8. The wireless remote control 10 can include throttle control 200, yaw control 202, pitch control 204, roll control 206, and gimbal control 208.

In embodiments, the throttle control, the yaw control, the pitch control and the roll control are used for communicating 113 with the aerial vehicle processor to control flight of the aerial vehicle.

Figure 2:
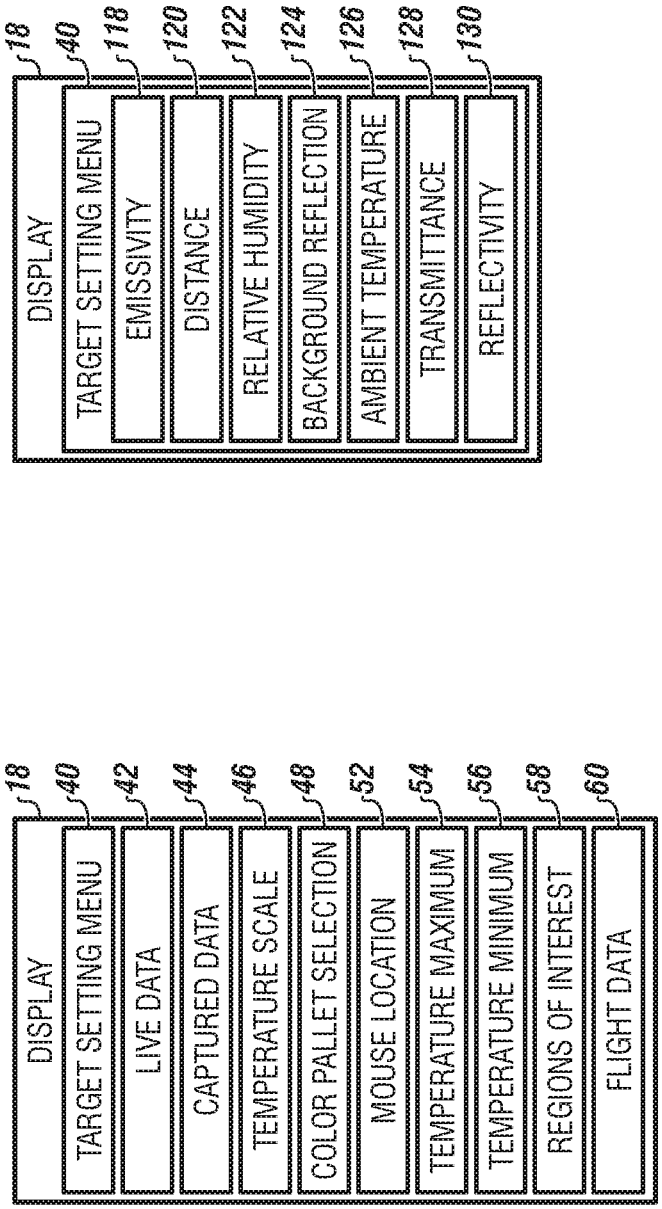
FIG. 2 depicts a diagram of an exemplary wireless remote control display according to one or more embodiments.

FIG. 2 depicts a diagram of an exemplary wireless remote control display according to one or more embodiments.

In embodiments, the wireless remote control display can show content from the onboard cameras, imaging sensors and radiometric camera.

For example, the display 18 can show live data 42 from one or all of the onboard radiometric cameras and imaging sensors. An example of live data 42 can be a direct feed image from one of the sensors, such as a visible light camera feed one frame at a time or one pixel at a time.

The display 18 can show captured data 44. An example of captured data 44 can be frame by frame data that resides on the imaging sensor data storage.

The display 18 can also show a target setting menu 40.

The display 18 can have a temperature scale 46, which can be from −80 degrees Celsius to 2,000 degrees Celsius.

The display 18 can have a color pallet selection 48, which can be multiple shades with red shades depicting "hot temperatures" and blue shades depicting "cool" temperatures. In embodiments, the color pallets can be inverted.

The display 18 can have a mouse location 52, which can be a visible representation of the x-y coordinates of the target.

The display 18 can have a temperature maximum 54, which can be a user defined temperate limit, such as 2,000 degrees Celsius.

The display 18 can have a temperature minimum 56, which can be a user defined temperature limit opposite the temperature maximum, such as 0 degrees Celsius.

The display can have regions of interest 58, which can be shown, as well as flight data 60 showing altitude, speed, and orientation of the aerial vehicle.

Figure 3:
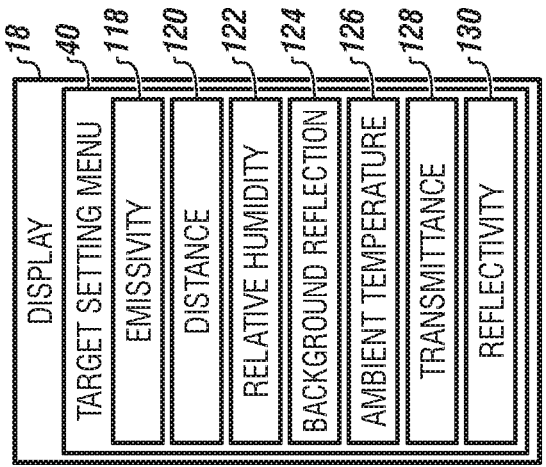
FIG. 3 depicts a target setting menu according to one or more embodiments.

FIG. 3 shows the target setting menu according to one or more embodiments.

In embodiments, the target setting menu 40 can be displayed on the display 18 of the wireless remote control 10.

The target setting menu 40 can include emissivity 118, distance 120, relative humidity 122, background reflection 124, ambient temperature 126, transmissivity 128, reflectivity 130, and combinations thereof.

In embodiments, the target setting menu can be a means for biasing a perceived temperature.

To capture data for aerial thermography, the user can identify the location and the target at the location.

The user can then mount the imaging sensor processor to the aerial vehicle, such as a multi-rotor unmanned aerial vehicle. The imaging sensing processor can be connected to the aerial vehicle power supply and the aerial vehicle processor.

The radiometric camera can be mounted to the gimbal on the aerial vehicle and connected to the imaging sensing processor and the aerial vehicle power supply.

The wireless remote control can then be turned on.

The aerial vehicle power supply can then be actuated.

A system check can then be performed, going through a check list of systems of the aerial vehicle and the cameras, ensuring the aerial vehicle is able to fly.

The user can then operate the throttle control to cause the aerial vehicle to lift off. The throttle control, the yaw control, the pitch control and the roll control can then be used to navigate the aerial vehicle to the desired location.

The target can be identified at the desired location.

The gimbal control can be operated to position the cameras and orient them at the target.

The wireless remote control can then be used to capture data by manipulating one or more of the controls of the controller of the wireless remote control, such as zoom, or by toggling through the cameras and/or the at least one imaging sensor to change mode of at least one of the imaging sensors.

The imaging sensor data storage can store the captured data from the cameras and the at least one imaging sensor. The imaging sensor data storage can be removable, such as a media card, jump drive, SD card, or removable hard drive.

The aerial vehicle can be landed and powered down.

The imaging data storage or removable data storage with captured data can be removed from the aerial vehicle.

Post processing, reporting, and mapping of the thermal images can then be performed, including, but not limited to stitching, creating mosaics of the images, and creating reports using the captured data.

While these embodiments have been described with emphasis on the embodiments, it should be understood that within the scope of the appended claims, the embodiments might be practiced other than as specifically described herein.

What is claimed is:

1. A wireless remote control assembly to wirelessly perform aerial thermography and data capture for a target, the wireless remote control assembly comprising:
   a. an imaging sensor processor mounted to an aerial vehicle in communication with an aerial vehicle processor and an aerial vehicle power supply on the aerial vehicle;
   b. a radiometric camera mounted on the aerial vehicle in communication with the imaging sensor processor and the aerial vehicle power supply;
   c. at least one imaging sensor mounted on the aerial vehicle and in communication with the imaging sensor processor and the aerial vehicle power supply; and
   d. a wireless remote control comprising:
      (i) a remote control processor in communication with the display and the imaging sensor processor to provide commands to perform aerial thermography and data capture using the radiometric camera and the at least one imaging sensor; and
      (ii) a controller in communication with the imaging sensor processor to selectively provide commands to the imaging sensor processor causing the imaging sensor processor to capture data and store the captured data in an imaging sensor data storage, wherein the controller comprises a variable intensity level control and a variable span control and optionally:
         1. a region of interest control;
         2. a capture data control;
         3. a camera selection control;
         4. a zoom control;
         5. a mode control; or
         6. a target setting menu; and
      (iii) a display wherein maximum temperature or minimum temperature values are scaled with the variable intensity level control or the variable span control.

2. The wireless remote control assembly of claim 1, wherein the controller variably controls intensity levels corresponding to temperatures emitted by the target.

3. The wireless remote control assembly of claim 1, wherein the controller variably controls span to adjust a range of temperatures captured by the radiometric camera.

4. The wireless remote control assembly of claim 1, wherein the imaging sensor data storage contains a temperature scale for adjusting intensity level and span.

5. The wireless remote control assembly of claim 1, wherein the target setting menu comprises at least one of:
   a. emissivity;
   b. distance;
   c. relative humidity;
   d. background reflection;
   e. ambient temperature;
   f. reflectivity; and
   g. transmissivity.

6. The wireless remote control assembly of claim 1, wherein the zoom control widens or narrows a field of view of at least one: the radiometric camera and the at least one imaging sensor.

7. The wireless remote control assembly of claim 1, wherein the camera selection control is configured to allow a user to select the at least one imaging sensor, the radiometric camera or an additional camera mounted on the aerial vehicle and provide an image to the display, and wherein, the camera selection control enables the user to sequence through the at least one imaging sensor, the radiometric camera and the additional cameras mounted on the aerial vehicle.

8. The wireless remote control assembly of claim 1, wherein the wireless remote control further comprises:
   a. a throttle control;
   b. a yaw control;
   c. a pitch control; and
   d. a roll control.

9. The wireless remote control assembly of claim 8, wherein the throttle control, the yaw control, the pitch control and the roll control are used for communicating with the aerial vehicle processor to control flight of the aerial vehicle.

10. The wireless remote control assembly of claim 1, wherein the wireless remote control further comprises a gimbal control to wirelessly pitch and yaw a gimbal mounted to the aerial vehicle and to support the radiometric camera and the at least one imaging sensor.

11. The wireless remote control assembly of claim 1, further comprising from 2 cameras to 32 cameras mounted to the aerial vehicle and in communication with the aerial vehicle power supply and the imaging sensor processor.

12. The wireless remote control assembly of claim 1, wherein the region of interest control defines a subset of pixels from the target for monitoring in real time.

13. The wireless remote control assembly of claim 1, wherein the commands of the wireless remote control comprise commands for making biasing corrections to a perceived temperature.

14. The wireless remote control assembly of claim 1, wherein the display further comprises flight data.

15. The wireless remote control assembly of claim 1, wherein the imaging sensor processor further comprises commands for post-processing, reporting, or mapping the captured data.

* * * * *